United States Patent [19]
Lee et al.

[11] Patent Number: 6,137,525
[45] Date of Patent: Oct. 24, 2000

[54] PERSONAL DATA COMMUNICATION APPARATUS

[75] Inventors: Kyeong-Won Lee; Hee Jong Moon, both of Seoul; Ho-Young Choi, Kyungki-do, all of Rep. of Korea

[73] Assignee: LG Electronics Inc., Seoul, Rep. of Korea

[21] Appl. No.: 09/024,301

[22] Filed: Feb. 17, 1998

[30] Foreign Application Priority Data

Feb. 19, 1997 [KR] Rep. of Korea ......................... 97/4948
Dec. 31, 1997 [KR] Rep. of Korea ....................... 97/80417

[51] Int. Cl.[7] ................... H04N 7/14; H04N 7/00; H04B 7/00
[52] U.S. Cl. .................. 348/14; 348/552; 455/66; 455/575
[58] Field of Search ..................... 348/13, 14, 16, 348/552, 207, 151, 158; 455/90, 66, 575

[56] References Cited

U.S. PATENT DOCUMENTS

| | | | |
|---|---|---|---|
| 4,934,773 | 6/1990 | Becker | 345/8 |
| 5,111,498 | 5/1992 | Guichard et al. | 348/14 |
| 5,155,615 | 10/1992 | Tagawa | 345/9 |
| 5,414,444 | 5/1995 | Britz | 348/158 |
| 5,485,504 | 1/1996 | Ohnsorge | 348/14 |
| 5,491,507 | 2/1996 | Umezawa et al. | 348/14 |
| 5,606,594 | 2/1997 | Register | 455/90 |
| 5,612,708 | 3/1997 | Ansley et al. | 345/8 |
| 5,760,834 | 6/1998 | Rostoker | 348/340 |
| 5,825,408 | 10/1998 | Yuyama et al. | 348/14 |
| 5,886,735 | 3/1999 | Bullister | 348/14 |
| 5,893,037 | 4/1999 | Reele et al. | 348/14 |

*Primary Examiner*—Wendy Garber
*Assistant Examiner*—Alicia M. Harrington
*Attorney, Agent, or Firm*—Fleshner & Kim, LLP

[57] ABSTRACT

A personal data communication apparatus that provides a camera, a magnified image in a display and a video telecommunication system within a compact handset housing is disclosed. The personal data communication apparatus can include a memory that stores image information from the camera converted into an electrical signal as data. A transmission controlling part accesses the data stored in the memory and transmits to a radio public telecommunication network in response to a user signal requesting a video communication and displays the image information received as an image signal from the public telecommunication network. The personal data communications apparatus can further include a receiver receiving a voice, a viewfinder type display adapted to magnify the image information, a speaker for transmitting a voice and a system driving part for entering system operation control signals by the user. The camera is a compact design using a diffractive optic system to be mounted within a housing. The housing preferably encompasses the personal data communications apparatus with the speaker rotatably attached to an upper portion of the housing to protect the camera in a closed position and the receiver rotatably attached to a lower portion of the housing to protect the display in a closed position.

20 Claims, 10 Drawing Sheets

DOE LENS    CCD
(IRIS)

PERSONAL DATA COMMUNICATION APPARATUS

BACKGROUND OF THE INVENTION

1. Field of the Invention

The present invention relates to a personal data communication apparatus, and more particularly, to a personal data communication apparatus having a diffractive optic system camera for transmitting image when a user desires and a magnifying display.

2. Discussion of the Related Art

Figure 1:
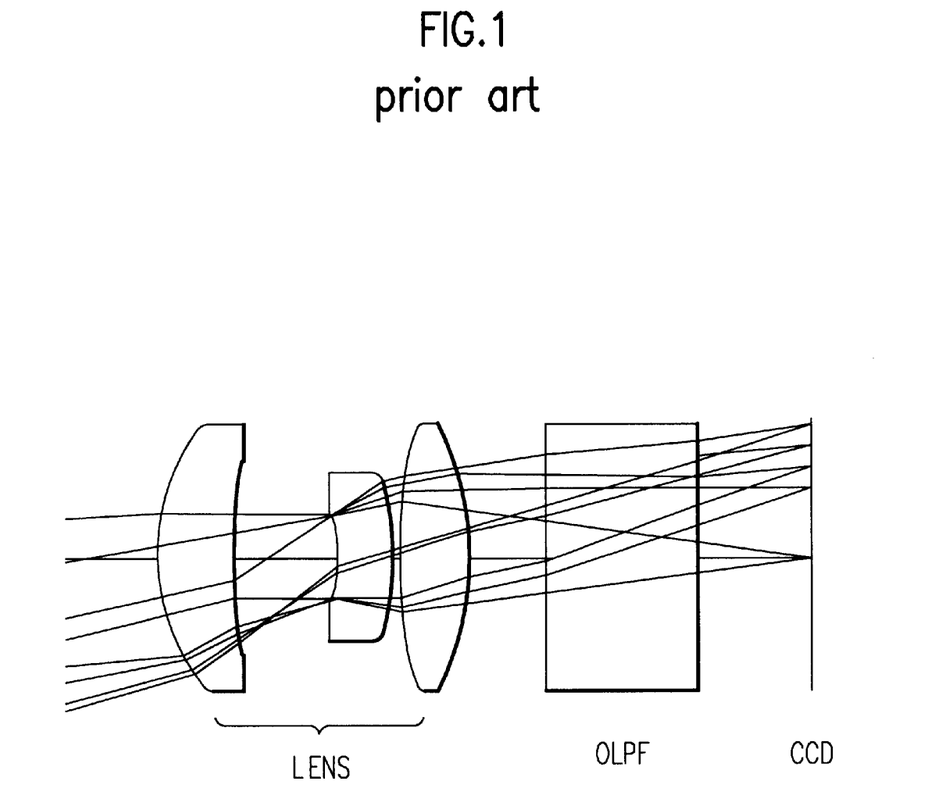
FIG. 1 illustrates a lens unit of a geometrical optic system in a general camera application.
Figure 2:
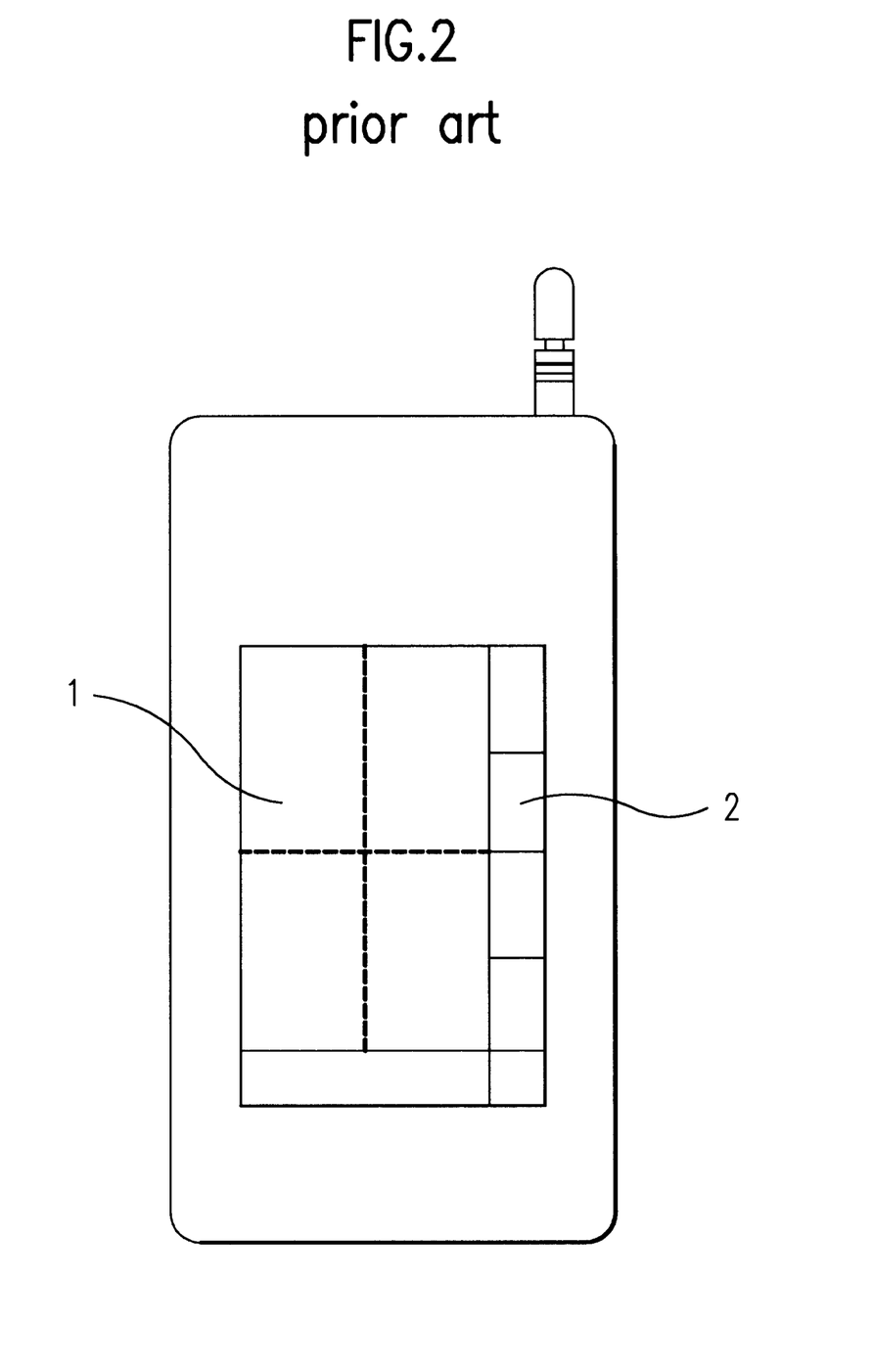
FIG. 2 illustrates a background art personal data communication apparatus.

As working-at-home is wide spread keeping pace with the development of a data communication network, job sites, which have been limited to particular places such as offices, are being gradually extended to homes of workers of an enterprise. Accordingly, office equipments, such as telephones, facsimile machines, copying machines, computers and the like are provided individually for each person. However, since providing all the equipments individually is a substantial economic burden to the persons, currently equipments with functions for some of the above office equipments are under production. Particularly, because persons, not stationary at a fixed place, but highly mobile, can not always carry the office equipments, personal data communication apparatuses have been developed, in which, of the office equipments, a telephone and a facsimile machine and the like are integrated for allowing persons to carry. However, the background art personal data communication apparatuses have no video communication function built-therein. Therefore, a person who desires to make a video communication, should use a video telephone system of others, other than his own personal data communication apparatus. The video telephone system is provided with a camera for receiving data and a display for presenting data. As shown in FIG. 1, a geometrical optic system in a general camera application is provided with 3 to 4 lenses, with an optical low pass filter(OLPF) in front of a CCD. However, with the camera having such a geometrical optic system, making a length of a camera shorter than 10 mm is impossible. That is, it is very difficult to make a camera compact with the geometrical optic system employed. And, as shown in FIG. 2, the background art personal data communication apparatus is provided with a front panel having a display 1 and an icon part 2, with four sheets of small sized LCD panels bonded together for providing a wider display area in the display 1.

However, such as personal data communication apparatus has problems in that the apparatus is difficult to carry due to a large overall size of the apparatus coming from a size of the LCD panel and the display appears small because a front of the LCD panel is formed with a glass substrate. And, the background art personal data communication apparatus, developed with pre-conditions of information security and personal carrying, has problems in that the apparatus has a low reliability in information security with a possibility of privacy infringement.

SUMMARY OF THE INVENTION

Accordingly, the present invention is directed to a personal data communication apparatus that substantially obviates one or more of the problems due to limitations and disadvantages of the related art.

An object of the present invention is to provide a personal data communication apparatus having a small sized video communication device built-therein, to allow a user to make a video communication without any additional device, as the user desires.

Another object of the present invention is to provide a personal data communication apparatus which allows an image to appear larger than in the case of the background art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the personal data communication apparatus includes a camera for receiving an image, a memory for storing the image of a user converted into an electrical signal in the camera, a transmission controlling part for accessing to a data stored in the memory and transmitting to a radio public telecommunication network in response to a signal requesting a video communication when the user desires, a receiver part mounted on an upper part of a body housing for receiving a voice, a display of viewfinder type adapted to magnify a presented image, a transmitter part for transmitting a voice, and a system driving part for entering a system operation control signal by the user.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a farther understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 3:
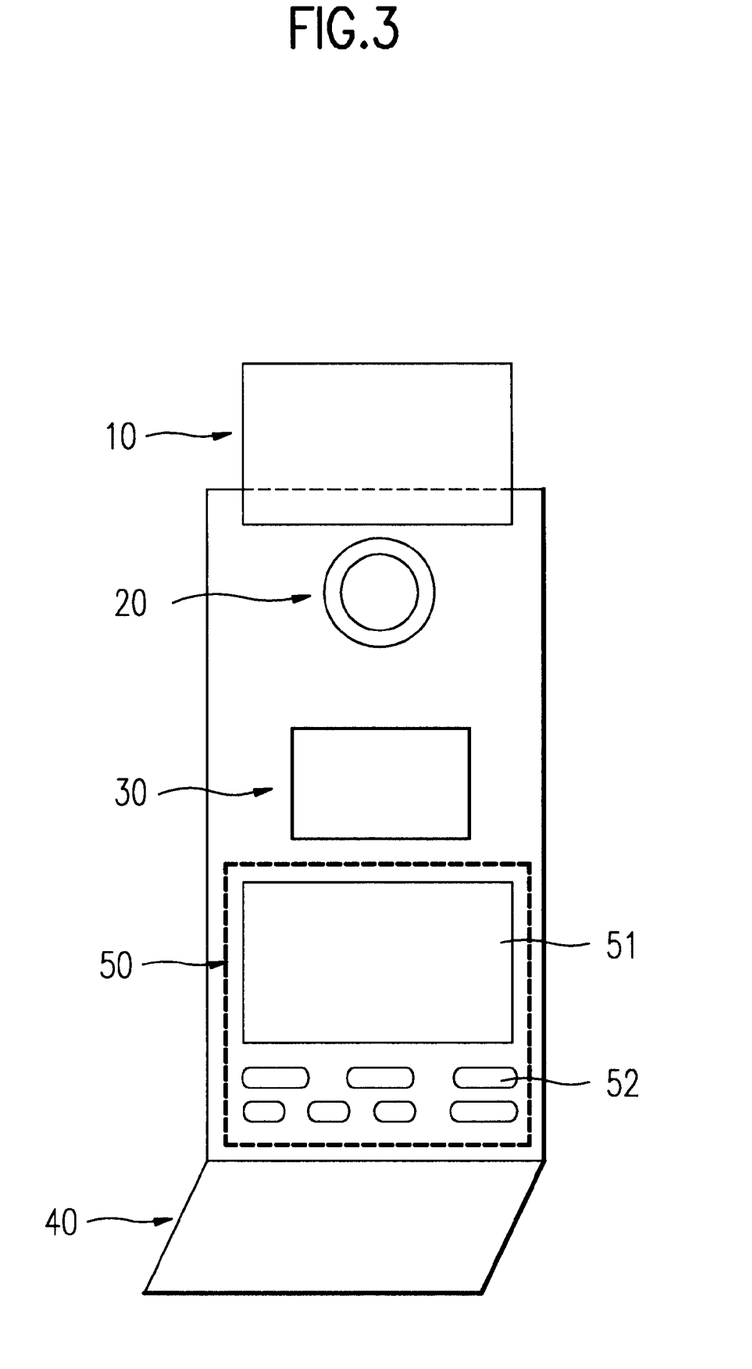
FIG. 3 illustrates a front view of a personal data communication apparatus in accordance with a first preferred embodiment of the present invention.
Figure 4:
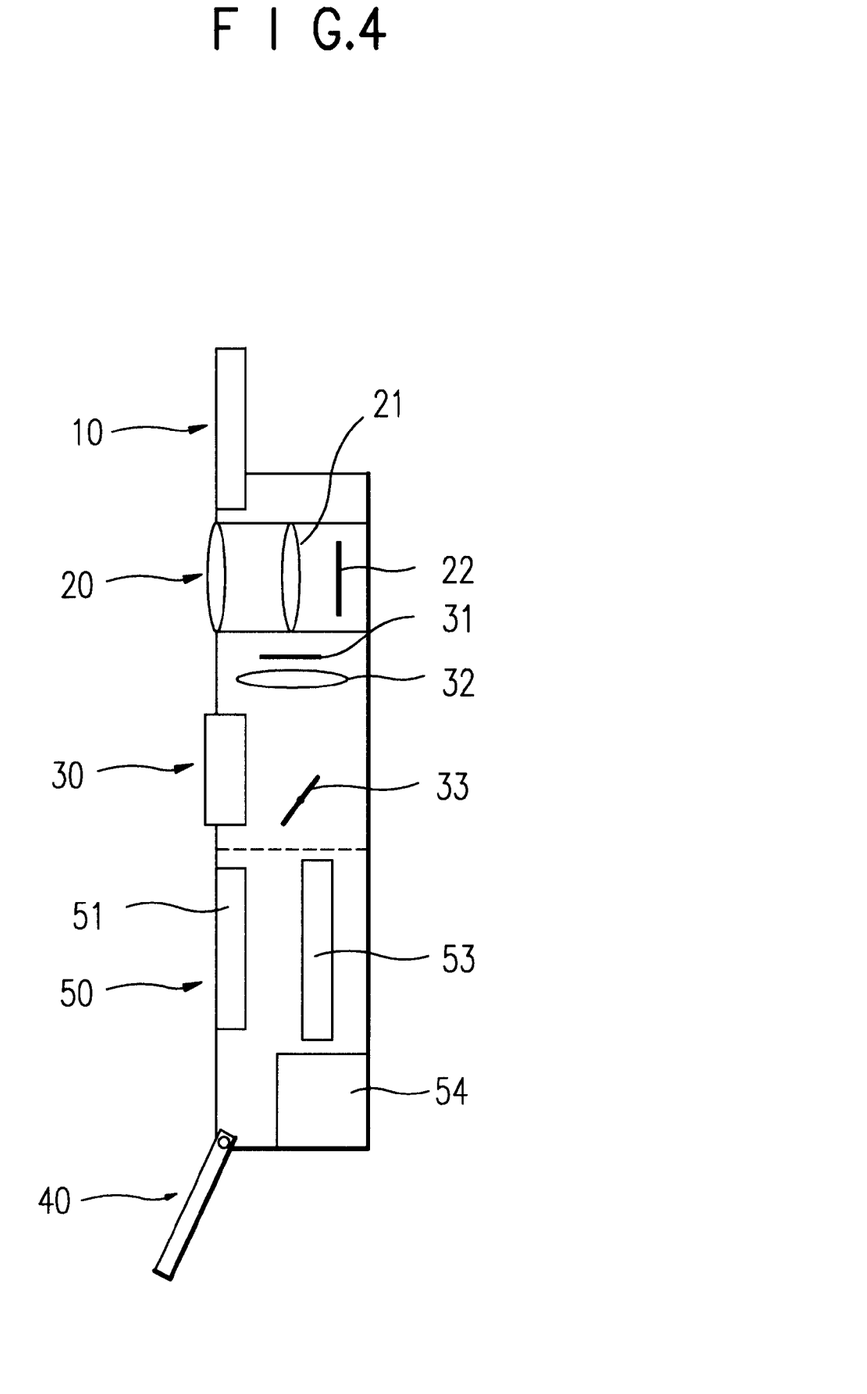
FIG. 4 illustrates a sectional view of a side of a personal data communication apparatus shown in FIG. 3.

Reference will now be made in detail to the preferred embodiments of the present invention, examples of which are illustrated in the accompanying drawings. FIGS. 3 and 4 respectively illustrate front and sectional side views of a personal data communication apparatus in accordance with a first preferred embodiment of the present invention.

Referring to FIGS. 3 and 4, there is a camera 20 provided with a DOE(Diffractive Optical Element) lens unit 21 and a CCD(Charge Coupled Device) 22. The DOE lens unit receives the information of the object, and the CCD receives the information and converts the image into an electrical signal. And, there is a display 30 provided with a line LED 31, a magnifying lens 32 and a rotatable mirror 33. The line LED 31 provides a line portion of data of the image to be displayed at a time in a sequence. The magnifying lens 32 magnifies the image provided line by line by the LED. The rotatable mirror 33 reflects a light passed through the magnifying lens 32 to display a video data on the display. The rotatable mirror has its rotating angle changed synchronized to a period of the data provision from the line LED, for displaying the image on all the lines on the display. And, there is a system driving part 50 provided with a touch panel 51, mode selection button part 52, main PCB 53 and a battery 54. The touch panel 51 is provided with an icon part for a user to enter telephone numbers and any arbitrary number. The mode selection button part 52 is provided with operation keys such as a power key and different switches for selecting a mode according to system operation. The main PCB 53 has various components for operating the system mounted thereon. The battery 54 as a power supply supplies a power for driving the personal data communication apparatus. And, there are a receiver part 10 and a transmitter part 40 also serving as covers for the camera 20, the display 30 and the system driving part 50 for protecting them. The receiver part 10 and the transmitter part 40 are preferably hinged on the body for unfolding them in use. The reference numeral 10 denotes the receiver part hinged on an upper portion of the body housing for unfolding in use, 20 denotes the camera employing a diffractive optic system, 30 denotes the display of viewfinder type application for magnifying a provided image, 40 denotes the transmitter part hinged on a lower portion of the body housing for unfolding in use, and 50 denotes the system driving part for the user to enter system operation control signals.

The operation of the aforementioned personal data communication apparatus of the present invention will be explained.

When the line LED 31 in the display 30 provides a first image of one line portion, the first image is magnified by the magnifying lens 32 and displayed on the display through the rotatable mirror 33. Thereafter, when the line LED 31 provides a second image of the next line, the second image is magnified by the magnifying lens and displayed on the display at a line thereof next to a line on which the first image was displayed, by changing a reflection angle of the rotatable mirror 33. That is, the rotatable mirror is rotated such that the rotating angle is changed to correspond to a certain line of an image, for reflecting and displaying the image passed through the magnifying lens 32 on the display through the window on the body housing, thereby making a scanning for all the lines.

Figure 5A:
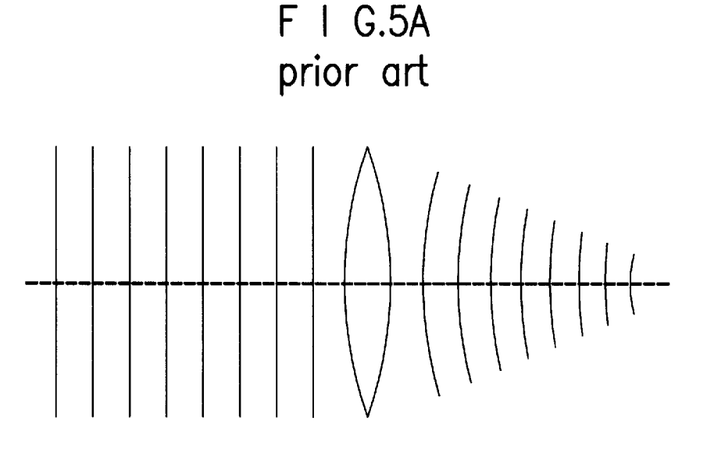
FIGS. 5a and 5b illustrate a lens in a camera of a background art personal data communication apparatus and a lens in a camera of a personal data communication apparatus of the present invention respectively, for the comparison of principle.
Figure 5B:
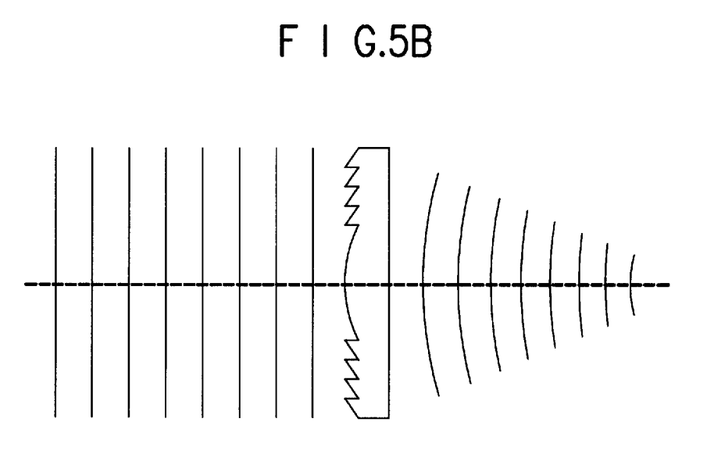
Figure 6:
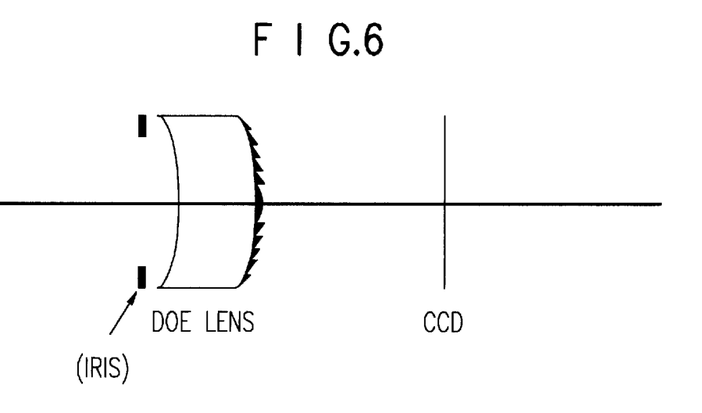
FIG. 6 illustrates a lens unit in a camera of a diffractive optic system application.

A comparison of lenses in the cameras of the present invention and the background art will be made with reference to FIGS. 5a and 5b. Though the lens system in the background art camera has a long overall(OAL) length because of the use of a geometrical optic system with a combination of convex and concave lenses as shown in FIG. 5a, the lens system in the camera of the present invention has a less number of lenses and shorter overall because of the use of diffractive optic system as shown in FIG. 5b. FIG. 6 illustrates a compact camera unit of a diffractive optic system application, wherefrom it can be noted that the total length of the lens is very compact compared to FIG. 1, with a performance almost identical to the background art.

The personal data communication apparatus of the present invention may further provided with a transmission controlling part and a reception controlling part. The transmission controlling part transmits the video data stored in a memory to a radio public telecommunication network in response to a signal requesting a video communication when the user has a requirement for the video communication. The transmission controlling part may be provided with a switch for generating the signal requesting a video communication. And, the reception controlling part may control a modem in response to the signal generated in the switch to receive data from the radio public telecommunication network to display a desired video data on the display.

Figure 7:
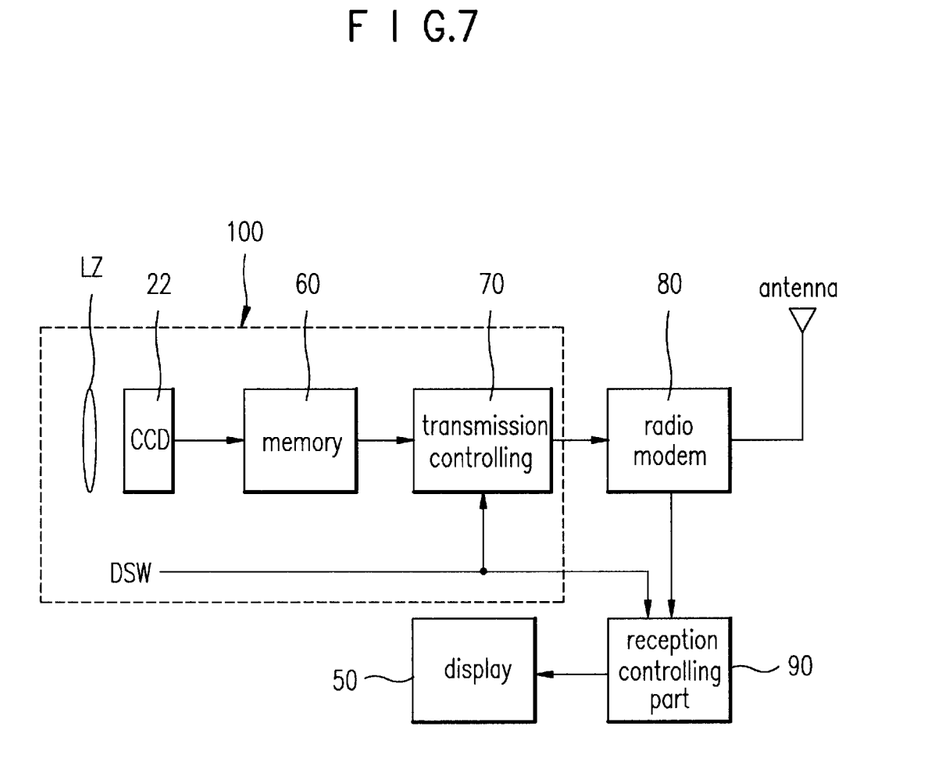
FIG. 7 illustrate a block diagram of a camera and a radio communication system for transmitting a video data received at the camera of the present invention.
Figure 8:
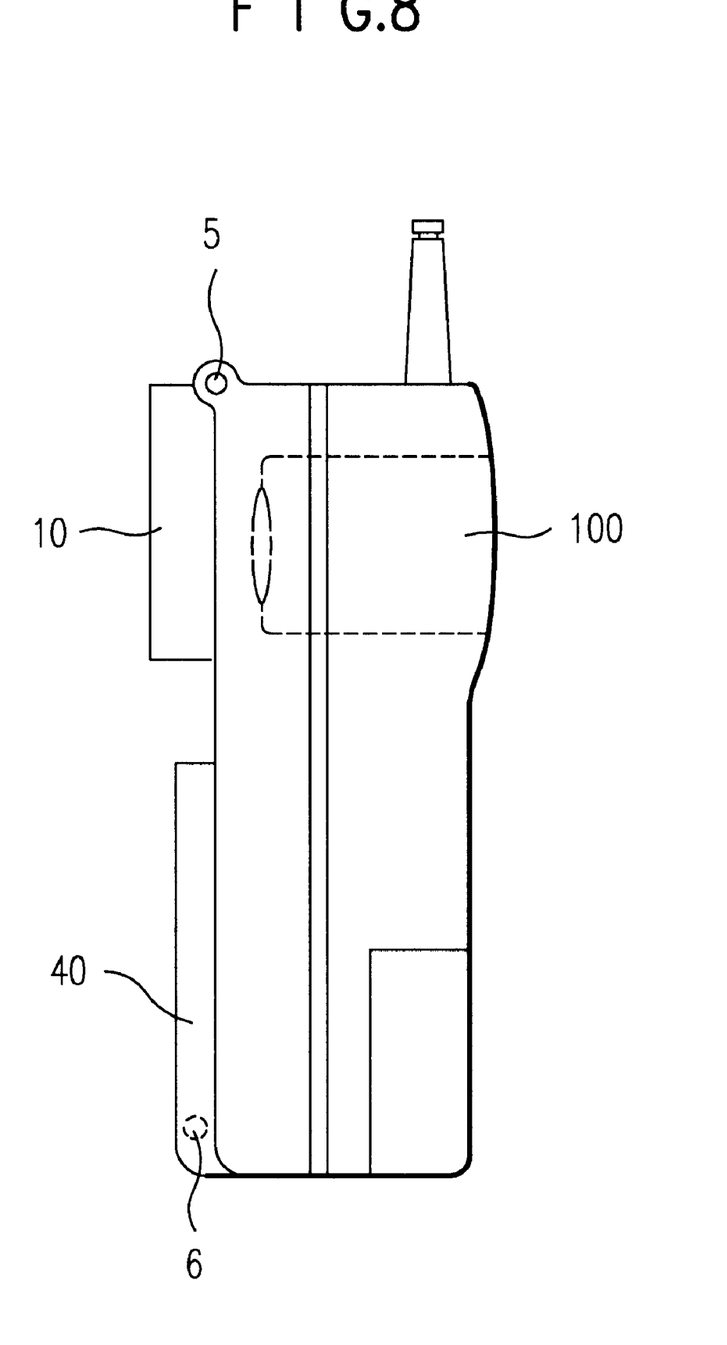
FIG. 8 illustrates a personal data communication apparatus of the present invention showing a position of a camera built-therein.
Figure 9:
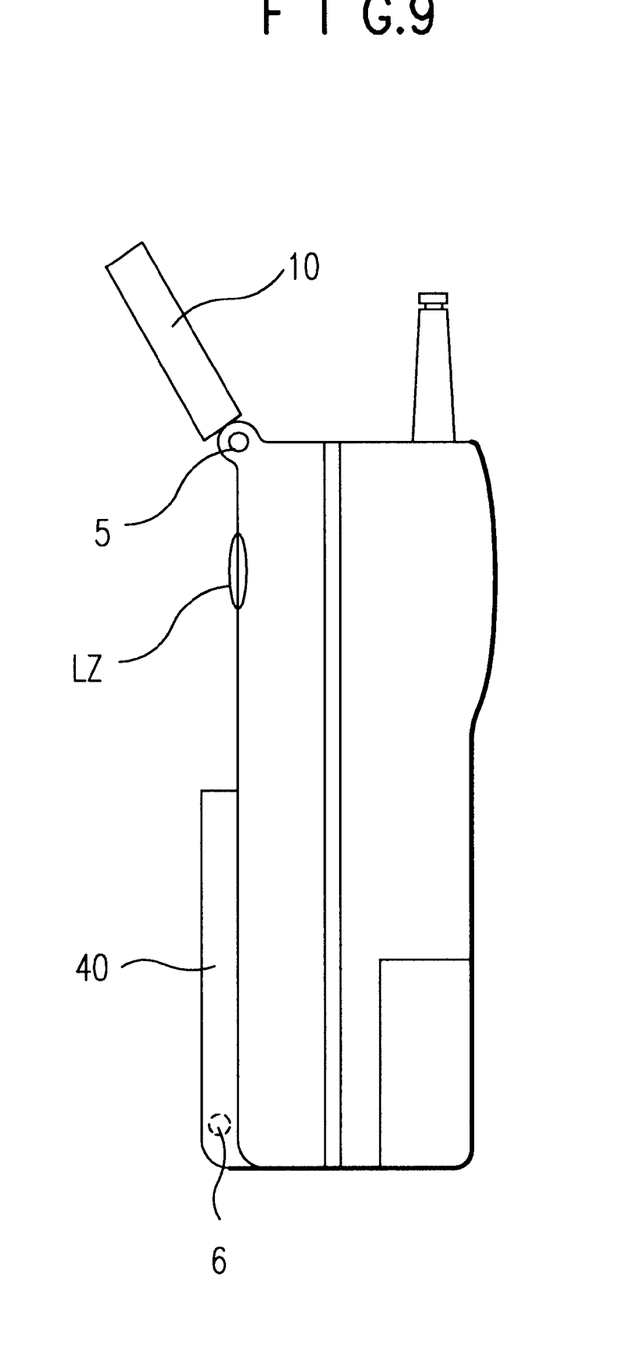
FIG. 9 illustrates a posture of a personal data communication apparatus of the present invention for making a video communication.
Figure 10:
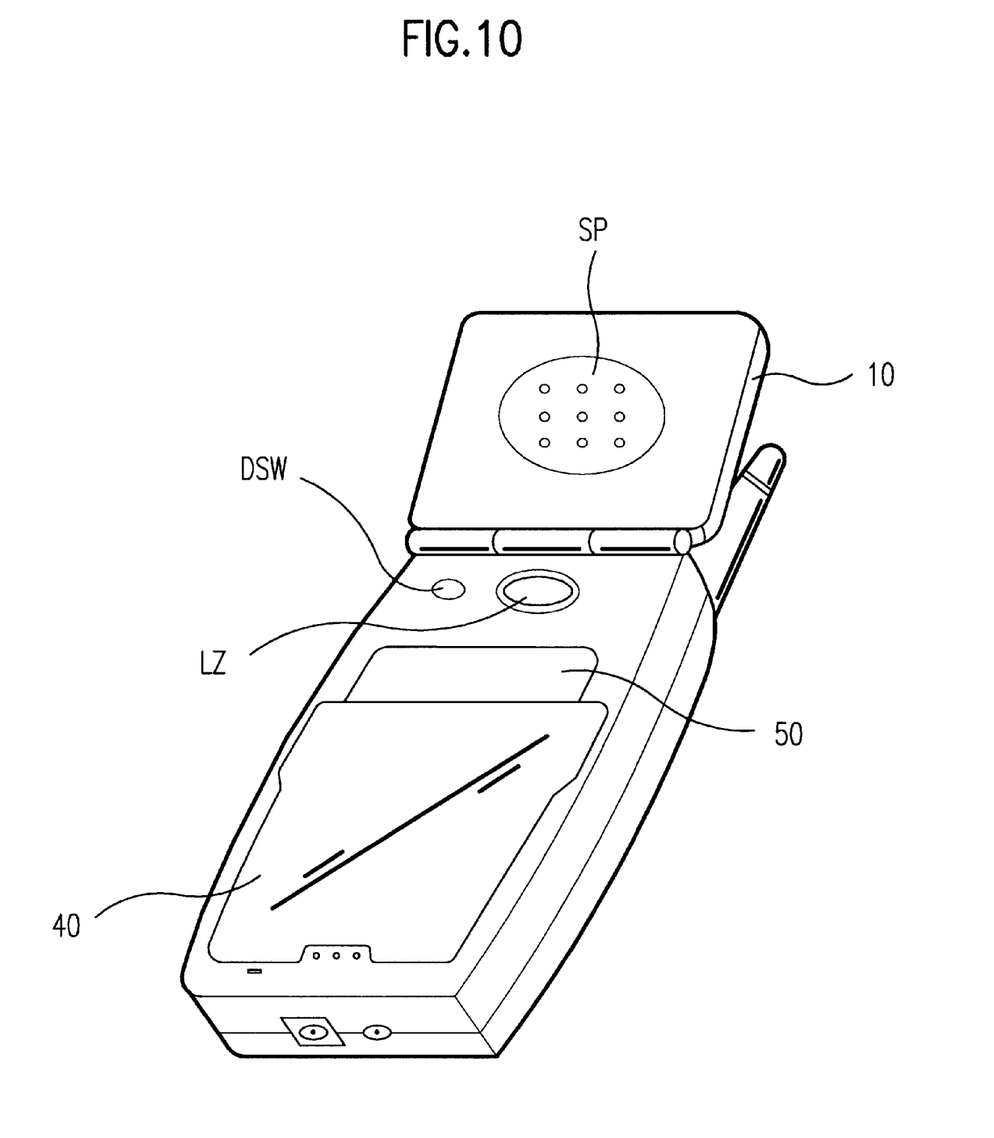
FIG. 10 illustrates a perspective view of the personal data communication apparatus shown in FIG. 9.
Figure 11:
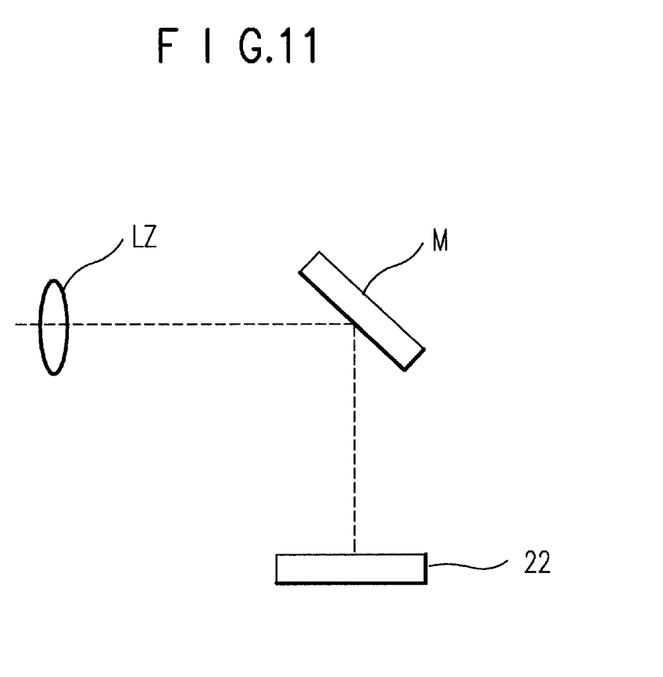
FIG. 11 illustrates maintaining a distance between a lens and a CCD using a mirror; and, FIG. 12 illustrates maintaining a distance between a lens and a CCD using a prism.
Figure 12:
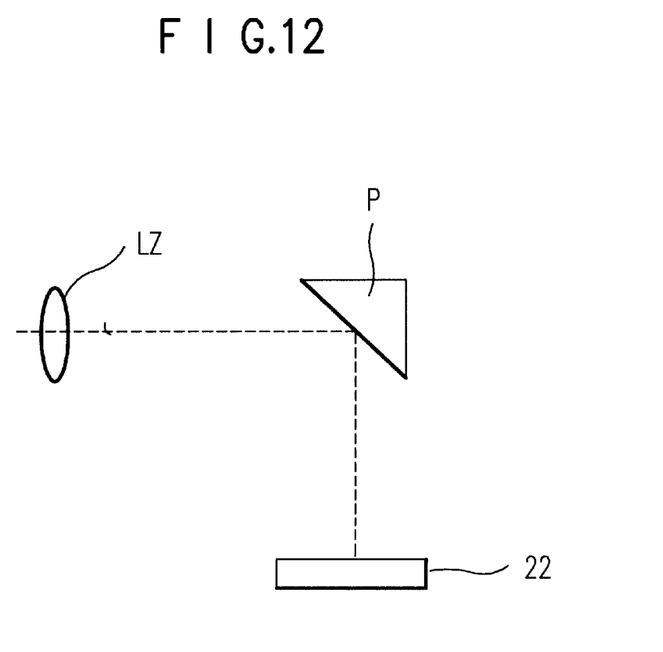

FIG. 7 illustrate a block diagram of a camera and a radio communication system for transmitting a video data received at the camera of the present invention, FIG. 8 illustrates a personal data communication apparatus of the present invention showing a position of the camera of FIG. 7 built-therein, FIG. 9 illustrates a posture of the personal data communication apparatus of the present invention of FIG. 8 for making a video communication, FIG. 10 illustrates a perspective view of the personal data communication apparatus shown in FIG. 9, FIG. 11 illustrates maintaining a distance between a lens and a CCD using a mirror, and FIG. 12 illustrates maintaining a distance between a lens and a CCD using a prism.

A second embodiment personal data communication apparatus of the present invention includes a CCD 22, a memory 60, a radio modem(or a radio FAX), a transmission controlling part 70, a display 50 and a reception controlling part 90. The CCD 22 coverts an image focused by a lens system LZ into an electrical signal, and the memory 60 stores the electrical signal therein. The radio modem 80 modulates a video data or an audio data into a radio signal and transmits the signal through an antenna, and receives a radio signal through the antenna and restores into a video data or an audio data. The transmission controlling part 70 transmits the data stored in the memory 60 to a public telecommunication network through the radio modem 80 in response to a signal generated in the switch(DSW in FIG. 10) when a user intends a video telecommunication. The reception controlling part 90 controls such that the data received through the radio modem 80 in response to the signal generated in the switch DSW is display on the display 50 as a video data. That is, the camera 100 of the present invention has the lens system LZ, the CCD 22 and the transmission controlling part 70, together with the switch DSW for requesting a video telecommunication when the user desires. The radio modem 80, the display 50 and the reception controlling part 90, in charge of a conventional facsimile function collectively, has been modified slightly for coupling with the camera of the present invention.

Referring to FIG. 8, the camera 100 of the present invention is positioned at a part shown in dashed line of the personal data communication apparatus. An external configuration of the personal data communication apparatus of the present invention is changed in comparison to the background art personal data communication apparatus; though the background art personal data communication apparatus has the speaker(not shown) built-in an upper part of the apparatus, the personal data communication apparatus of the present invention has the speaker part 10 hinged on the body to be folded in an up and down direction. Arrangements of others, such as cover 40 and hinge therefor of the personal data communication apparatus are the same with the background art. FIG. 9 illustrates the personal data communication apparatus of the present invention having the speaker part 10 flipped for video and audio telecommunication. That is, when the speaker part 10 is flipped to an upper direction centered on the hinge 5, a speaker SP at a back of the speaker part 10 as well as the lens LZ and the switch DSW covered by the speaker part 10 are exposed. When the user presses the exposed switch DSW for a video telecommunication, the transmission controlling part 70 converts an operation mode of the personal data communication apparatus into a video transmission mode. Then, an image of the user focused by the lens LZ is converted into an electrical signal at the CCD 22 and stored in the memory 60. And, the transmission controlling part 70 transmits the data stored in the memory 60 to a public telecommunication network through the radio modem 80. In this instance, if a person on the other end of the line transmits a video telecommunication data, the reception controlling part 90 receives the data through the radio modem 80 and displays the image on the display 50.

Since the camera 100 of the present invention requires an adequate optical path between the lens LZ and the CCD 22, the personal data communication apparatus having the camera mounted thereon may have a thickness thicker than the background art personal data communication apparatus by more than 10 mm, such that the lens may project from the body of the personal data communication apparatus as shown in FIGS. 8 and 9. In order to prevent the lens projected from the body while assuring an adequate optical path between the lens LZ and the CCD 22, a reflective mirror M or a prism P may be used in the personal data communication system of the present invention as shown in FIGS. 11 or 12.

As has been explained, the use of the diffractive optic system in the personal data communication apparatus of the present invention allows to reduce a number of lenses, with subsequent reduction of a total length of a lens system, that can make the camera compact. The viewfinder type of display in the personal data communication system of the present invention allows to see a magnified image using a small display. Accordingly, as the personal data communication apparatus of the present invention allows a user to make a video communication when he wanted, no separate video telecommunication system is not required, assuring the user of a security reliability and protection of privacy.

It will be apparent to those skilled in the art that various modifications and variations can be made in the personal data communication apparatus of the present invention without departing from the spirit or scope of the invention. Thus, it is intended that the present invention cover the modifications and variations of this invention provided they come within the scope of the appended claims and their equivalents.

What is claimed is:

1. A personal data communication apparatus that selectively performs a function of transmitting and receiving an image signal, the personal data communication apparatus comprising:

a housing for encompassing the personal data communication apparatus;

a camera located on a front upper part of the housing, for receiving an information, and for inputting the image signal;

a memory for storing the image signal from the camera;

a transmission and reception controller for controlling operations of reading the image signal from the memory and transmitting the image signal to a wireless public telecommunication network according to a user's request signal, and operations of displaying the image signal received from the wireless public telecommunication network;

a speaker mounted on an upper part of the housing, for outputting a voice signal, wherein the speaker is a flip type covering the camera lens;

a viewfinder within the housing for magnifying and displaying the image signal stored in the memory;

a system driver located in a lower part of the housing, for inputting control signals that control operations of the apparatus;

a display located on the front part of the housing for displaying one of the received image signal and an input state of the system driver; and a microphone mounted on the lower part of the housing, for transmitting the voice.

2. A personal data communication apparatus as claimed in claim 1, wherein the camera includes:

a camera lens for inputting external images through a window formed in front of the housing; and, a CCD for converting the image input from the camera lens to an electrical signal.

3. A personal data communication apparatus as claimed in claim 2, wherein the lens is a diffractive optic lens.

4. A personal data communication apparatus as claimed in claim 2, wherein the camera further includes a reflecting means for changing a path of the image signal between the camera lens and the CCD.

5. A personal data communication apparatus as claimed in claim 4, wherein the reflecting means is one of a mirror and a prism.

6. A personal data communication apparatus as claimed in claim 1, wherein the camera includes a diffractive optic lens.

7. A personal data communication apparatus as claimed in claim 1, wherein the microphone is a flip type covering the display.

8. A personal data communication apparatus as claimed in claim 1, wherein the viewfinder includes, a line LED for displaying the image signal input from the camera in a line unit in sequence, a magnifying lens magnifying the displayed image signal, a rotating mirror part scanning the magnified image signal, and a display part displaying the scanned image signal.

9. A personal data communication apparatus as claimed in claim 1, wherein the system driver further includes a switch for transmitting the control signal requesting transmission and reception of the image signal to the transmission controlling part when a user desires.

10. A personal data communication apparatus as claimed in claim 1, further comprising a switch for entering a signal for requesting a video telecommunication when a user desires into the transmission controlling part.

11. A personal data communication apparatus as claimed in claim 1, wherein further comprising:

an LCD for displaying a received signal;
a reception controlling part for receiving a data from a radio public telecommunication network through a modem means and displaying on a LCD as an image data in response to a signal generated in the switch.

12. An apparatus, comprising:
a housing that encompasses the apparatus, wherein the housing has dimensions being a prescribed height, width and depth;
a camera within the housing having a total length of a lens system less than 10 millimeters, wherein the camera receives and inputs an image signal;
a memory for storing at least the image signal from the camera;
a controller for controlling operations of the apparatus including reading the image signal from the memory;
an input device coupled to the controller for inputting user commands;
a display system extending to the front part of the housing for displaying at least one of the image signals and an input state of the apparatus, wherein the display system comprises a viewfinder, further comprising,
a line LED that displays the image signal input from the camera in sequence,
a magnifying lens that magnifies the displayed image signal,
a rotating mirror part that scans the magnified image signal according to a prescribed sequence, and
a display part that displays the scanned image signal;
an antenna for transmitting and receiving signals including image signals with an external communications system, wherein the memory stores the image signals from the external communications system, and wherein the controller controls operations of the apparatus including transmitting the image signals to the external communications system, and displaying the image signals received from the external communications system;
a speaker mounted on an upper part of the housing, wherein the prescribed length is greater than the prescribed width that is greater than the prescribed depth of the housing, and wherein the speaker is a flip type covering the camera lens in a closed position; and
a microphone mounted on the lower part of the housing, wherein the microphone is a flip type covering the display system in a closed position.

13. The apparatus as claimed in claim 12, wherein the camera includes:
a camera lens for inputting external images through a window formed in the housing, wherein the lens is a diffractive optic lens, and wherein the camera is mounted within the prescribed depth dimension of the apparatus; and
a CCD for converting the images input from the camera lens to electrical signals.

14. The apparatus of claim 12, wherein the camera comprises:
a camera lens for inputting external images through a window formed in the housing, wherein the lens is a diffractive optic lens, and wherein the camera is mounted within the prescribed depth dimension of the apparatus;
a CCD for converting the images input from the camera lens to electrical signals; and
a prism positioned as such that an optical path between the camera lens and the CCD forms a right angle at the prism.

15. A personal data communication apparatus, comprising:
a housing the encompasses the personal data communication apparatus, wherein the housing has dimensions being a prescribed height, width and depth;
a camera having a diffractive optic lens, wherein the camera is mounted within the housing for receiving and inputting an image signal;
a memory for storing at least the image signal;
a controller for controlling operations of the apparatus including reading the image signal from the memory;
an input device coupled to the controller for inputting user commands;
a display system extending to the front part of the housing for displaying at least one of the image signals and an input state of the apparatus, wherein the display system comprises a viewfinder further comprising,
a line LED that displays the image signal input from the camera in sequence,
a magnifying lens that magnifies the displayed image signal,
a rotating mirror part that scans the magnified image signal according to the prescribed sequence, and
a display part that displays the scanned image signal;
an antenna for transmitting and receiving signals including image signals with an external communications system, wherein the memory stores the image signals from the external communications system, and wherein the controller controls operations of the apparatus including transmitting the image signal to the external communications system, and displaying the image signals received from the external communications systems;
a speaker mounted on an upper part of the housing, wherein the prescribed length is greater than the prescribed width that is greater than the prescribed depth of the housing and wherein the speaker is a flip type covering the camera lens in a closed position; and
a microphone mounted on the lower part of the housing, wherein the microphone is a flip type covering the display system in a closed position.

16. The personal data communication apparatus as claimed in claim 15, wherein the camera includes:
a camera lens for inputting external images through a window formed in the housing, wherein the camera has a total length of a lens system less than 10 millimeters; and
a CCD for converting the images input from the camera lens to electrical signals.

17. The apparatus of claim 15, wherein the camera further comprises:
a CCD for converting the images input from the diffractive optic lens to electrical signals; and
a prism positioned such that an optical path between the diffractive optic lens and the CCD forms a right angle at the prism.

18. A personal data communication apparatus, comprising:
a housing that encompasses the personal data communication apparatus, wherein the housing has dimensions such that a length is greater than a width, which is greater than a depth;
a camera within the housing for receiving and inputting an image signal;

an antenna for transmitting and receiving signals including image signals with an external communications systems;

a memory for storing at least the image signal from the camera and the external communications system;

a controller for controlling operations of the apparatus including reading the image signal from the memory and transmitting the image signal to the external communications system, and displaying the image signal received from the external communications system;

an input device coupled to the controller for inputting user commands;

a display system for displaying at least one of the image signals and an input state of the system driver, wherein the display system includes a scanning-type viewfinder that magnifies and displays the image signals;

a speaker mounted on an upper part of the housing, wherein the speaker is a flip type reciprocating between first and second positions, wherein the first position covers the camera lens; and a microphone mounted on the lower part of the housing, wherein the microphone is a flip type reciprocating between first and second positions, wherein the first position covers the display system and wherein the camera comprises, a camera lens for inputting external images through a window formed in the housing, wherein the lens is a diffractive optic lens, and wherein the camera has total length of a lens system less than 10 millimeters, and a CCD for converting the images input from the camera lens to electric signals.

19. The personal data communication apparatus as claimed in claim 18, wherein the scanning-type viewfinder comprises:

a line LED that displays the image signals in sequence;

a magnifying lens that magnifies the displayed image signals;

a rotating mirror part that scans the magnified image signals according to a prescribed sequence; and a display part that displays the scanned image signals.

20. The apparatus of claim 18, further comprising a prism positioned such that an optical path between the camera lens and the CCD forms a right angle at the prism.

* * * * *